US009628640B2

(12) United States Patent
Lee

(10) Patent No.: US 9,628,640 B2
(45) Date of Patent: Apr. 18, 2017

(54) METHOD FOR INITIAL SETUP OF IMAGE FORMING APPARATUS USING NEAR FIELD COMMUNICATION AND IMAGE FORMING APPARATUS FOR PERFORMING THE SAME

(71) Applicant: Samsung Electronics Co., Ltd., Suwon-si (KR)

(72) Inventor: Joong-mok Lee, Yongin-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 5 days.

(21) Appl. No.: 14/471,502

(22) Filed: Aug. 28, 2014

(65) Prior Publication Data

US 2015/0103374 A1     Apr. 16, 2015

(30) Foreign Application Priority Data

Oct. 10, 2013  (KR) ........................ 10-2013-0120875

(51) Int. Cl.
    *G06F 3/12*      (2006.01)
    *H04N 1/00*    (2006.01)
    *H04W 4/00*   (2009.01)

(52) U.S. Cl.
    CPC ....... *H04N 1/00307* (2013.01); *G06F 3/1204* (2013.01); *G06F 3/1231* (2013.01); *G06F 3/1292* (2013.01); *H04N 1/00413* (2013.01); *H04W 4/008* (2013.01); *H04N 2201/006* (2013.01); *H04N 2201/0082* (2013.01); *H04N 2201/0094* (2013.01)

(58) Field of Classification Search
    None
    See application file for complete search history.

(56) References Cited

U.S. PATENT DOCUMENTS

| 8,380,977 B2 | 2/2013 | Son et al. | |
|---|---|---|---|
| 2003/0231336 A1* | 12/2003 | Kim | G06F 3/1205 358/1.15 |
| 2006/0007500 A1* | 1/2006 | Abe | H04N 1/00127 358/401 |
| 2013/0110682 A1* | 5/2013 | Rosenblatt | G06Q 30/02 705/27.1 |
| 2014/0187149 A1* | 7/2014 | Lortz | H04W 4/008 455/41.1 |
| 2015/0097030 A1* | 4/2015 | Gallo | H04B 5/0031 235/439 |

\* cited by examiner

*Primary Examiner* — John Wallace
(74) *Attorney, Agent, or Firm* — Jefferson IP Law, LLP

(57) ABSTRACT

An initial setup method of an image forming apparatus using near field communication (NFC) according to an embodiment includes determining whether initial setup of the image forming apparatus is needed; displaying an initial setup menu on a display unit of the image forming apparatus when it is determined that the initial setup is needed; receiving initial setup data stored in the mobile terminal through NFC by the image forming apparatus when the mobile terminal is NFC tagged with the image forming apparatus; and performing initial setup of the image forming apparatus in accordance with the received initial setup data.

18 Claims, 8 Drawing Sheets

METHOD FOR INITIAL SETUP OF IMAGE FORMING APPARATUS USING NEAR FIELD COMMUNICATION AND IMAGE FORMING APPARATUS FOR PERFORMING THE SAME

CROSS-REFERENCE TO RELATED APPLICATIONS

This application claims the priority benefit of Korean Patent Application No. 10-2013-0120875, filed on Oct. 10, 2013, in the Korean Intellectual Property Office, the disclosure of which is incorporated herein in its entirety by reference.

BACKGROUND

1. Field

One or more embodiments relate to an initial setup method of an image forming apparatus using near field communication (NFC).

2. Description of the Related Art

In line with the development of mobile communication technology, office machines such as a printer or a multi-function printer fundamentally have a wireless communication function. In particular, in recent years, many multi-function printers, having a near field communication (NFC) function, have been released. Accordingly, these multi-function printers may simply transmit and receive data by performing only an operation of performing tagging with a device supporting an NFC function.

In machines such as a multi-function printer, initial setup operations of items such as a language, a date, a time, and network-related matters are needed prior to the use of the machines. However, some of the items required to be subjected to the initial setup may vary in setting value depending on users who attempt to use the machines or depending on situations.

SUMMARY

In an aspect of one or more embodiments, there is provided a method of simply performing initial setup of an image forming apparatus using NFC.

In an aspect of one or more embodiments, there is provided an initial setup method of an image forming apparatus using near field communication (NFC) which includes determining whether initial setup of the image forming apparatus is needed; displaying an initial setup menu on a display unit of the image forming apparatus when it is determined that the initial setup is needed; receiving initial setup data stored in the mobile terminal through NFC by the image forming apparatus when the mobile terminal is NFC tagged with the image forming apparatus; and performing initial setup of the image forming apparatus in accordance with the received initial setup data.

The receiving of the initial setup data may include requesting execution of an application for performing initial setup from the mobile terminal, when the mobile terminal is NFC tagged; requesting the initial setup data stored in the mobile terminal from the application; and receiving the requested initial setup data from the application.

The displaying of the initial setup menu on the display unit may include displaying a screen for requesting to select any one of an initial setup method using NFC and a manual initial setup method.

The displaying of the initial setup menu on the display unit may include displaying a message for requesting to tag a terminal supporting NFC when the initial setup method using NFC is selected.

The performing of the initial setup may include displaying the received initial setup data on the display unit of the image forming apparatus; and storing the initial setup data in a memory of the image forming apparatus, when conformation for the initial setup data displayed on the display unit is received from a user.

When a user does not confirm the initial setup data displayed on the display unit, the method may further include displaying the initial setup menu on the display unit by using the received initial setup data as a reference setting value.

Items subjected to the initial setup may include a language, a country, a time, a date, an administrator account, a time zone, and a clock mode.

In an aspect of one or more embodiments, there is provided an image forming apparatus supporting near field communication (NFC) which includes an NFC module for performing wireless communication with a mobile terminal supporting NFC; a user interface unit for displaying a screen to a user and receiving an input from the user; a memory for storing initial setup data; an image forming operation performing unit for performing an image forming operation; and a control unit. The control unit receives the initial setup data stored in the mobile terminal through NFC when the mobile terminal is NFC tagged with the NFC module in a state where an initial setup menu is displayed on the user interface unit, and performs initial setup of the image forming apparatus in accordance with the received initial setup data.

The control unit may request execution of an application for performing initial setup from the mobile terminal when the mobile terminal is NFC tagged with the NFC module, may request the initial setup data stored in the mobile terminal from the application, and may receive the requested initial setup data through the NFC module from the application.

The user interface unit may display a screen for requesting to select any one of an initial setup method using NFC and a manual initial setup method, and may receive an input of selection from a user.

The user interface unit may display a message for requesting to tag a terminal supporting NFC when a user selects the initial setup method using NFC.

The user interface unit may display the initial setup data received from the mobile terminal. The control unit may store the initial setup data in the memory when an input of confirmation for the initial setup data is received from the user.

When the control unit does not receive the input of confirmation for the initial setup data from the user, the initial setup menu may be displayed on the user interface unit by using the received initial setup data as a reference setting value.

Items subjected to the initial setup may include a language, a country, a time, a date, an administrator account, a time zone, and a clock mode.

According to an aspect of one or more embodiments, there is provided at least one non-transitory computer readable medium storing computer readable instructions that when executed control at least processor to implement methods of one or more embodiments.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
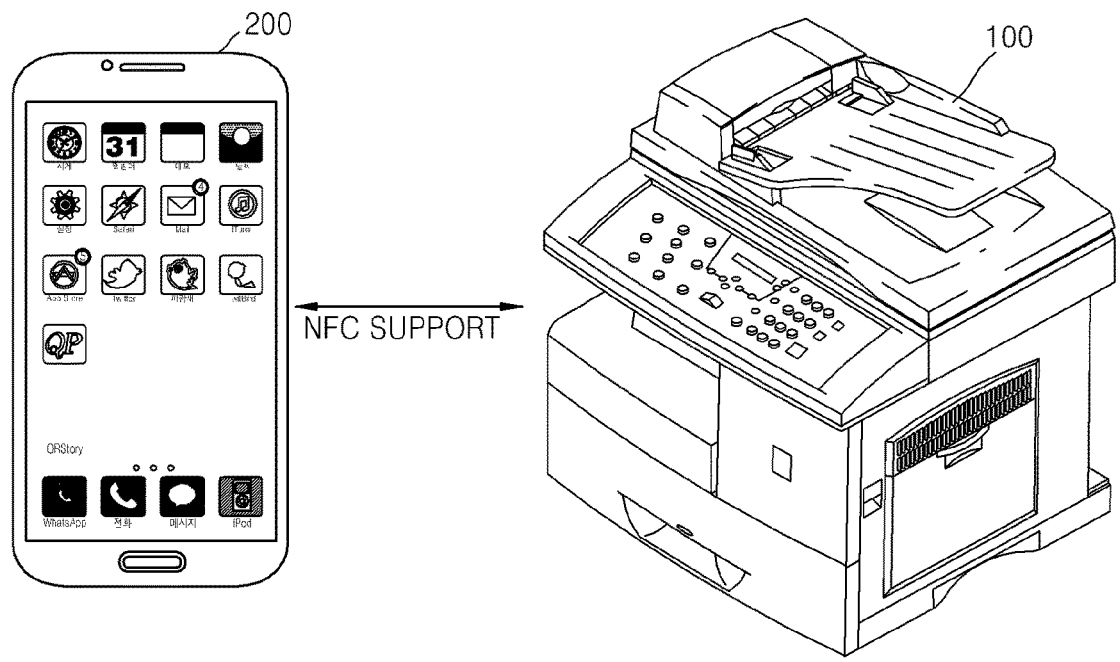
FIG. 1 is a diagram illustrating a multi-function printer and a mobile terminal for performing an initial setup method using NFC, according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein.

FIG. 1 is a diagram illustrating a multi-function machine 100 and a mobile terminal 200 for performing an initial setup method using NFC, according to an embodiment. For the implementation of an embodiment, both the multi-function printer 100 and the mobile terminal 200 have to support NFC. NFC supported by the multi-function printer 100 and the mobile terminal 200 may be active NFC or passive NFC, and the multi-function printer 100 and the mobile terminal 200 may include any one of an NFC chip, an NFC tag, and an NFC reader.

At this time, the multi-function printer 100 has been described as an example, but embodiments are not limited thereto. Various types of image forming apparatuses such as a printer, a fax machine, or a scanner may be used as the multi-function printer 100, and the mobile terminal 200 may be an information processing terminal, such as a smartphone or a tablet personal computer (PC), which is capable of performing wireless communication.

Figure 2:
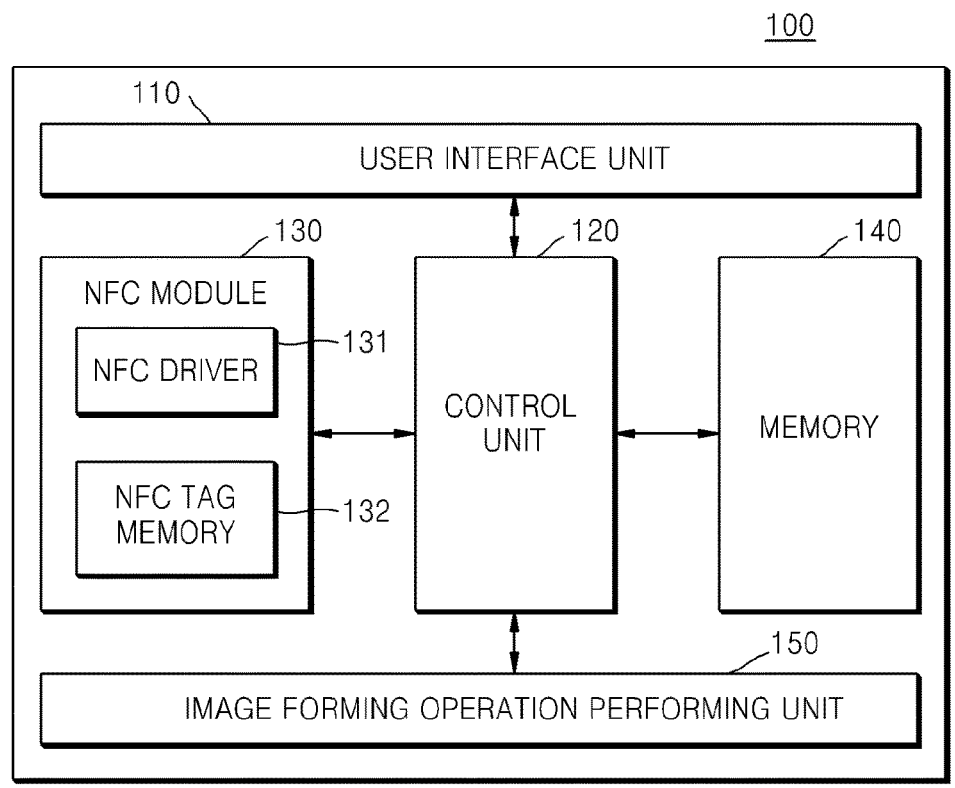
FIG. 2 is a diagram illustrating a configuration of a multi-function printer according to an embodiment.

FIG. 2 is a diagram illustrating a configuration of the multi-function printer 100 according to an embodiment. Referring to FIG. 2, the multi-function printer 100 according to the current embodiment may include a user interface unit (user interface) 110, a control unit (controller) 120, an NFC module 130, a memory 140, and an image forming operation performing unit (image forming operation apparatus(es) or image forming operation device(s)) 150. Here, the NFC module 130 may include an NFC driver 131 and an NFC tag memory 132.

The user interface unit 110 displays a screen to a user and receiving an input from the user. The user interface unit 110 may be, for example, a touch-type display panel included outside of the multi-function printer 100.

The control unit 120, which controls the overall operation of the multi-function printer 100, controls not only operations related to an image forming operation but also operations related to maintenance of the multi-function printer 100. In particular, the control unit 120 controls operations related to the initial setup of the multi-function printer 100.

At this time, the initial setup refers to setting of various items (pieces of information) for the multi-function printer 100 before using the multi-function printer 100. For example, the initial setup refers to setting of a language, a country, a time, a date, an administrator account, a time zone, a clock mode, and the like. In the related art, users have to input all initial setup items. However, embodiments provide a simple method of performing initial setup through NFC tagging with a mobile terminal, on the basis of information stored in the mobile terminal.

The NFC module 130 is a component for performing wireless communication with a device supporting NFC. When the NFC module 130 is tagged with a device supporting another NFC, the NFC module 130 sets wireless connection to allow transmission and reception of data. The NFC driver 131 may read out data from another NFC device or may transmit data to another NFC device. In addition, the NFC tag memory 132 may store data transmitted from another NFC device, or may store data that may be read out by another NFC device.

The memory 140 stores various pieces of data. In particular, the memory 140 may store initial setup information of the multi-function printer 100 in relation to an embodiment.

The image forming operation performing unit 150 is an apparatus for performing an image forming operation such as printing, copying, faxing, or scanning under the control of the control unit.

Operations of the above-described components will be described below in detail with reference to FIGS. 4 to 7.

Figure 3:
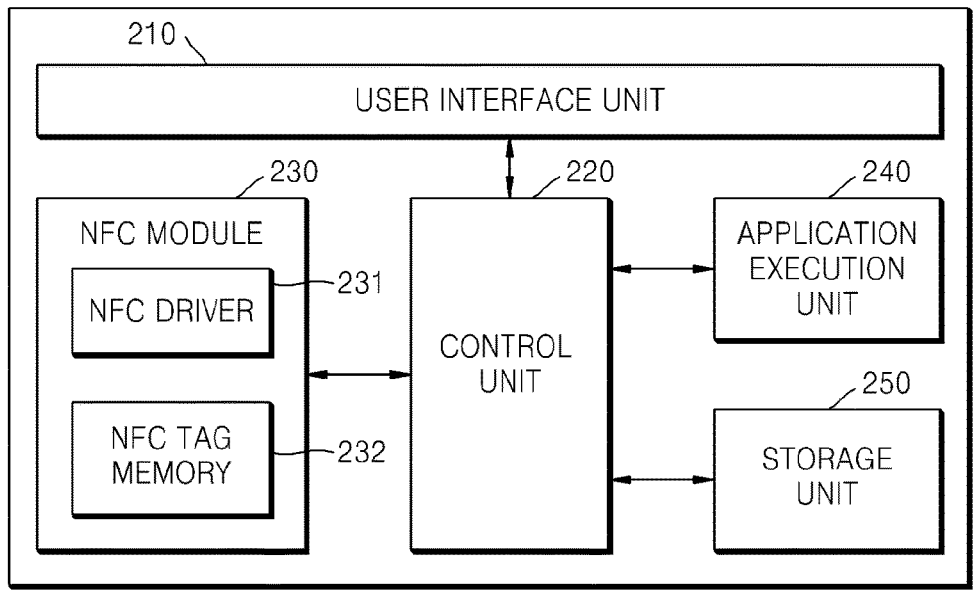
FIG. 3 is a diagram illustrating a configuration of a mobile terminal according to an embodiment.

FIG. 3 is a diagram illustrating a configuration of the mobile terminal 200 according to an embodiment. Referring to FIG. 3, the mobile terminal 200 according to the current embodiment may include a user interface unit (user interface) 210, a control unit (controller) 220, an NFC module 230, an application execution unit (application executer) 240, and a storage unit (storage) 250. At this time, the NFC module 230 may include an NFC driver 231 and an NFC tag memory 232.

The user interface unit 210 displays a screen to a user and receiving an input from the user. The user interface unit 210 may be, for example, a touch screen of the mobile terminal 200.

The control unit 220 controls the overall operation of the mobile terminal 200.

The NFC module 230 is a component for performing wireless communication with a device supporting NFC. When the NFC module 230 is tagged with a device supporting another NFC, the NFC module 230 sets wireless connection to allow transmission and reception of data. The NFC driver 231 may read out data from another NFC device or may transmit data to another NFC device. In addition, the NFC tag memory 232 may store data transmitted from another NFC device, or may store data that may be read out by another NFC device.

The application execution unit 240 is a component for executing an application installed in the mobile terminal 200. In the current embodiment, when the mobile terminal 200 is NFC tagged with the multi-function printer 100, the application execution unit 240 automatically executes an application for performing initial setup, in response to a request of the multi-function printer 100. At this time, the executed application acquires initial setup data stored in the mobile terminal 200 and transmits the initial setup data to the multi-function printer 100 through the NFC module 230.

The storage unit 250 stores various pieces of data. In particular, the storage unit 250 stores initial setup data of the mobile terminal 200.

Operations of the above-described components will be described below in detail with reference to FIGS. 4 to 7.

FIGS. 4 to 7 are diagrams illustrating operations performed during initial setup using the multi-function printer and the mobile terminal according to an current embodiment. Hereinafter, an initial setup process of the multi-function printer will be described in detail with reference to FIGS. 2 and 3.

Figure 4:
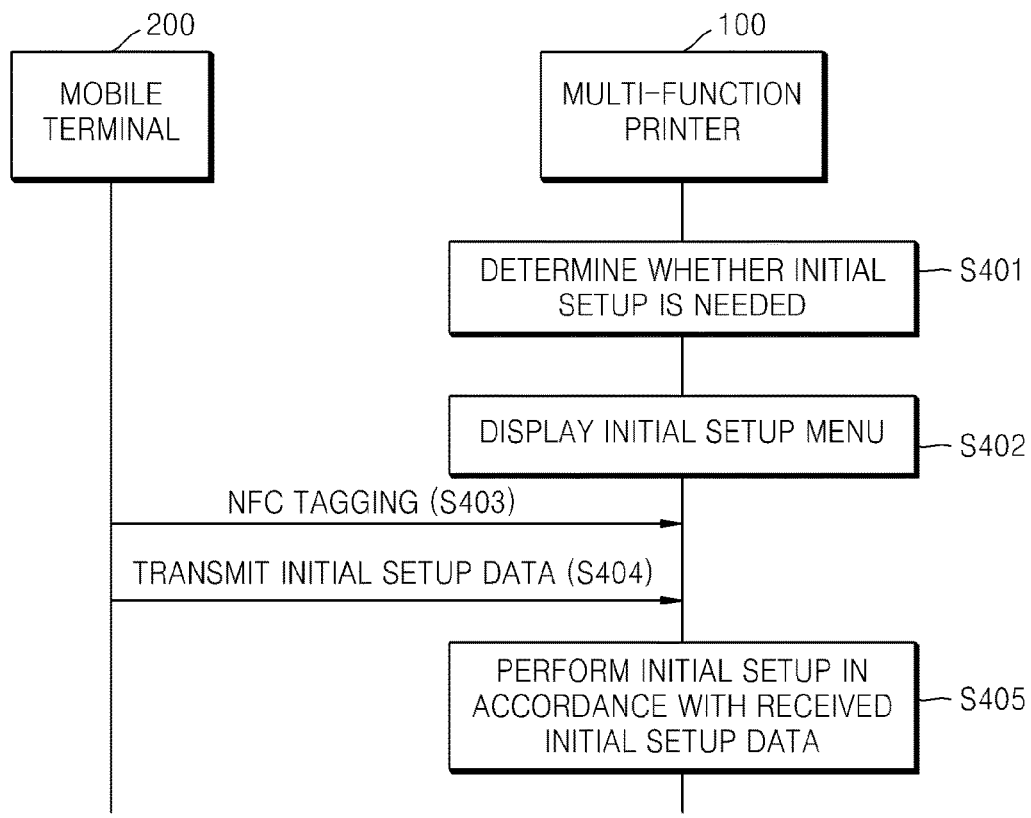
FIGS. 4 to 7 are diagrams illustrating operations performed during initial setup using a multi-function printer and a mobile terminal, according to embodiments.

Referring to FIG. 4, in operation S401, the control unit 120 of the multi-function printer 100 determines whether the initial setup of a language, a country, a time, a date, an administrator account, a time zone, a clock mode, and the like is needed. In a detailed method of determining whether initial setup is needed, it is determined that the initial setup is needed when the initial setup has not been performed on the multi-function printer 100 or when a user requests initial setup.

As a result of the determination of operation S401, when it is determined that the initial setup is needed, in operation S402, an initial setup menu is displayed on the user interface unit 210 of the multi-function printer 100. At this time, the initial setup menu refers to a menu in which items to be subjected to initial setup may be selected and setting values for the selected items may be input. A user may perform initial setup by a method of directly inputting values for the initial setup through the initial setup menu. However, in the current embodiment, the initial setup is performed by NFC tagging the mobile terminal 200 in a state where the initial setup menu is displayed on the user interface unit 110 of the multi-function printer 100.

In operation S403, when the mobile terminal 200 is NFC tagged with the NFC module 130 of the multi-function printer 100, the NFC module 130 of the multi-function printer 100 receives the initial setup data stored in the mobile terminal 200 from the mobile terminal 200 in operation S404. At this time, the initial setup data stored in the mobile terminal 200 includes information on values that are set in the mobile terminal 200. That is, the initial setup data includes a language, a country, a time, a date, an administrator account, a time zone, a clock mode, and the like, which are set in the mobile terminal 200.

In operation S405, the control unit 120 of the multi-function printer 100 performs the initial setup of the multi-function printer 100 in accordance with the received initial setup data. Accordingly, the setting of the multi-function printer 100 is performed in the same manner as the language, the country, the time, the date, the administrator account, the time zone, the clock mode, and the like, which are set in the mobile terminal 200.

In this manner, the initial setup of the multi-function printer 100 may be simply performed in the same manner as the setting of the mobile terminal 200 though only using NFC, thereby reducing inconvenience that a user has to input setting values.

Figure 5:
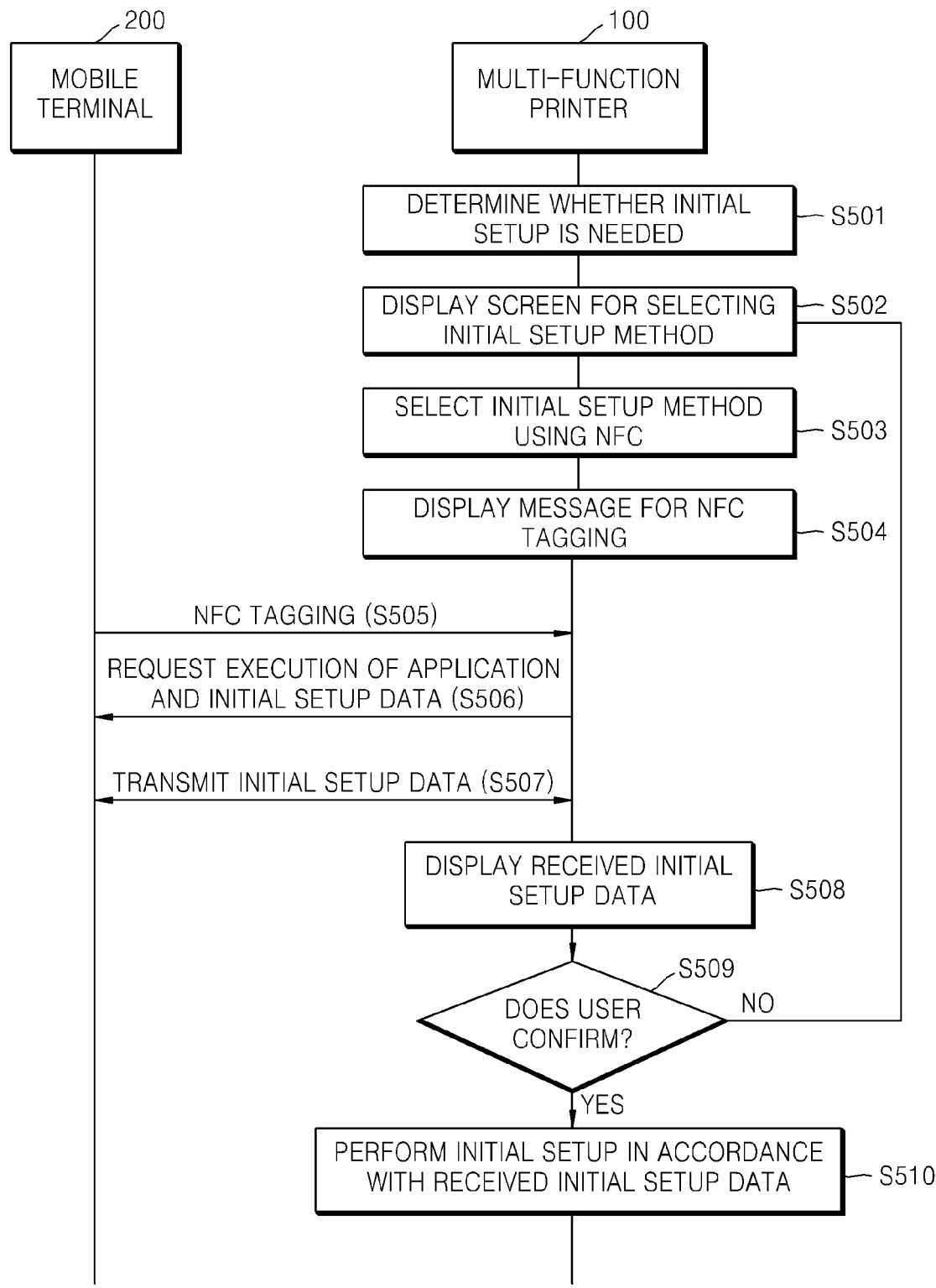

Referring to FIG. 5, in operation S501, the control unit 120 of the multi-function printer 100 determines whether initial setup is needed. When it is determined that the initial setup is needed, a selection screen based on an initial setup method is displayed on the user interface unit 110 in operation S502. That is, a screen capable of selecting any one of an initial setup method using NFC and an initial setup method based on manual input is displayed. At this time, the selection screen using an initial setup method may be displayed together with the initial setup menu.

In operation S503, when the initial setup method using NFC is selected, in operation S504, a notice to tag with the NFC device is displayed on the user interface unit 110 in the form of a message or graphics.

In operation S505, when the mobile terminal 200 is tagged with the NFC module 130 of the multi-function printer 100, in operation S506, the control unit 120 requests the execution of an application and initial setup data from the mobile terminal 100. At this time, the application is an application which is executed in the mobile terminal 200 in order to perform the initial setup of the multi-function printer 100. The application acquires the initial setup data stored in the mobile terminal 200 and transmits the initial setup data to the multi-function printer 100.

An application is automatically executed in the mobile terminal 200 in response to a request of the multi-function printer 100, and transmits the initial setup data of the mobile terminal 200 to the multi-function printer 100 in operation S507.

In operation S508, the initial setup data received in the user interface unit 110 of the multi-function printer 100 is displayed, and it is determined in operation S509 whether confirmation is input from a user. When the user views the initial setup data displayed on the user interface unit 110 of the multi-function printer 100 and then inputs the confirmation thereof, the method proceeds to operation S510, and the control unit 120 performs the initial setup of the multi-function printer 100 in accordance with the received initial setup data.

However, when an input of confirmation is not received from a user, the method returns to operation S502, and the selection screen based on the initial setup method is displayed together with the initial setup menu. At this time, the initial setup menu may be displayed using the initial setup data received in operation S507 as a reference setting value. This is because there is a high possibility that most the pieces of initial setup data received from the mobile terminal 200 are exact, but only some of them have an erroneous value, and thus when the user does not input confirmation, only the setting for the corresponding item may be corrected.

Figure 6:
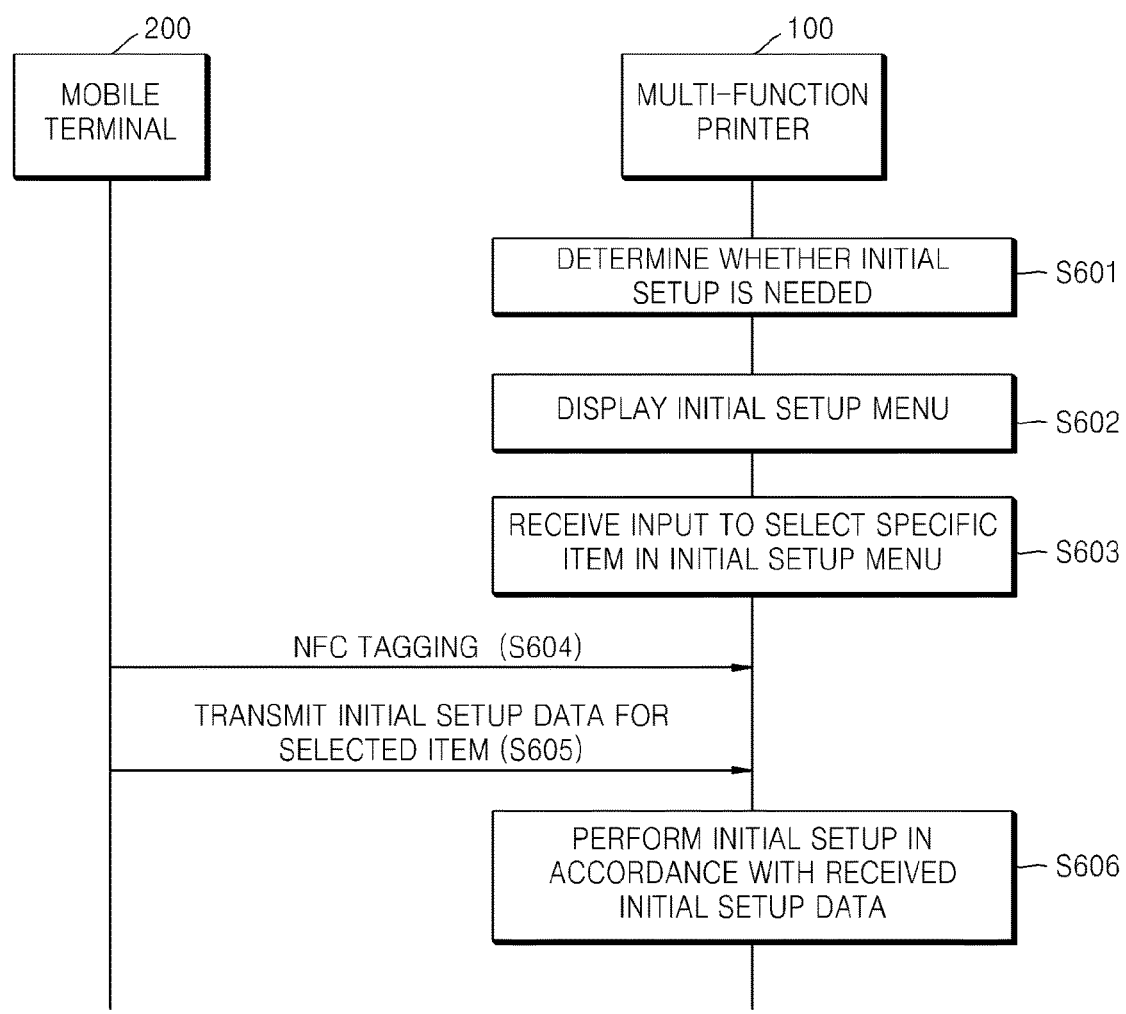

Referring to FIG. 6, in operation S601, the control unit 120 of the multi-function printer 100 determines whether initial setup is needed. When it is determined that the initial setup is needed, the initial setup menu is displayed on the user interface unit 110 in operation S602.

In operation S603, an input to select a specific item in the initial setup menu is received through the user interface unit 110 of the multi-function printer 100. For example, an input to select any one item from among a language, a country, a time, a date, an administrator account, a time zone, and a clock mode, which are initial setup items, is received.

When the input to select the item is received, a screen capable of setting the selected item is displayed on the user interface unit 110. In this state, when the mobile terminal 200 is NFC tagged with the multi-function printer 100 in operation S604, the mobile terminal 200 transmits the initial setup data for the selected item to the multi-function printer 100 in operation S605.

For example, when the mobile terminal 200 is NFC tagged in a state where a date item is selected in the initial setup menu and then a screen for setting a date is displayed on the user interface unit 110 of the multi-function printer 100, the multi-function printer 100 requests initial setup data for the date from the mobile terminal 200, and the mobile terminal 200 transmits the initial setup data for the date to the multi-function printer 100 in operation S605, in response to the request.

In operation S606, the control unit 120 of the multi-function printer 100 performs initial setup for the selected item of the multi-function printer 100 in accordance with the received initial setup data. As in the example described above, when the initial setup data for the date is received, the date of the multi-function printer 100 is set to the same date which is set in the mobile terminal 200.

Although an embodiment is not additionally described, only initial setup data for an item, which is determined in advance among initial setup items, may be received to perform initial setup. For example, in a case of a machine which is shared by many people like a multi-function printer used in an office, items such as a time or a date do not vary depending on individuals, but items such as a language or an administrator account may vary depending on individuals. Accordingly, when a mobile terminal is NFC tagged, only initial setup data for the language or the administrator account is received and initial setup is performed, and thus user convenience may be improved in an environment where many people share a multi-function printer.

Figure 7:
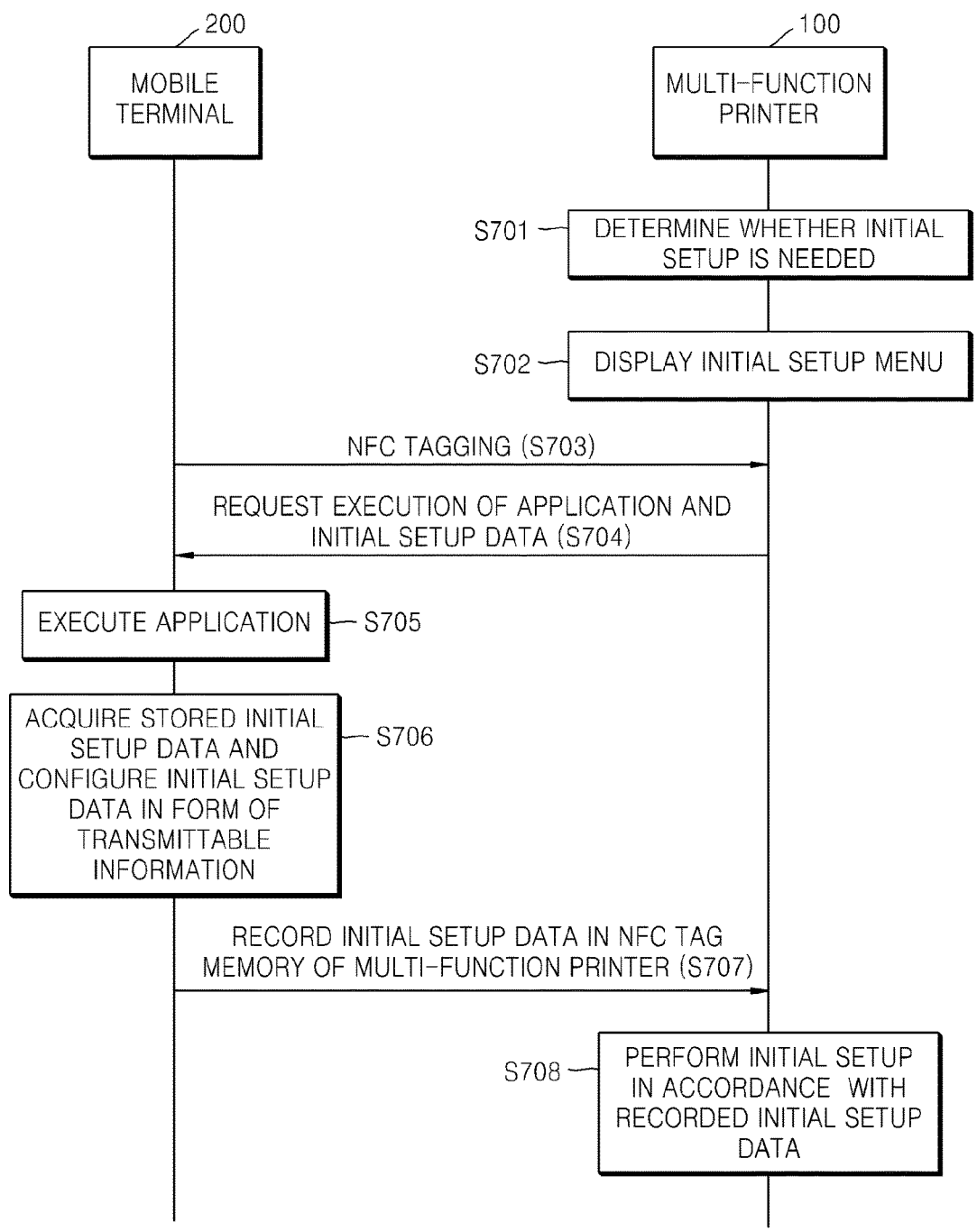

Referring to FIG. 7, in operation S701, the control unit 120 of the multi-function printer 100 determines whether initial setup is needed. When it is determined that the initial setup is needed, an initial setup menu is displayed on the user interface unit 110 in operation S702.

Subsequently, when the mobile terminal 200 is NFC tagged in operation S703, the multi-function printer 100 requests the execution of an application and initial setup data from the mobile terminal 200 in operation S704.

The control unit 220 of the mobile terminal 200 having received the request controls the application execution unit 240 to execute an application in operation S705. When the application is executed, in operation S706 the application acquires initial setup data stored in the storage unit 250 of the mobile terminal 200 and configures the initial setup data in the form of transmittable information.

Then, in operation S707, the NFC driver 231 of the mobile terminal 200 records the acquired initial setup data in the NFC tag memory 132 of the multi-function printer 100. In operation S708, the control unit 120 of the multi-function printer 100 performs initial setup in accordance with the initial setup data recorded in the NFC tag memory 132.

As described above, according to an embodiment, a user may simply perform NFC tagging of a mobile terminal without directly inputting initial setup, and thus the initial setup of a multi-function printer may be performed in accordance with the setting of the mobile terminal, thereby improving user convenience.

Figure 8:
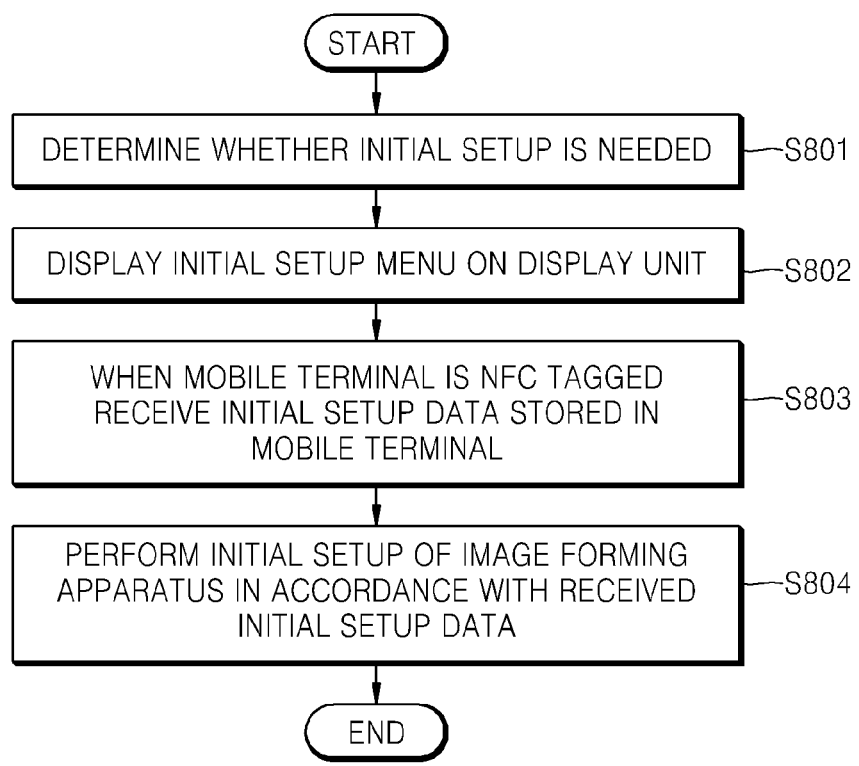
FIGS. 8 to 10 are flowcharts of operations of an initial setup method of an image forming apparatus using NFC, according to embodiments.
Figure 9:
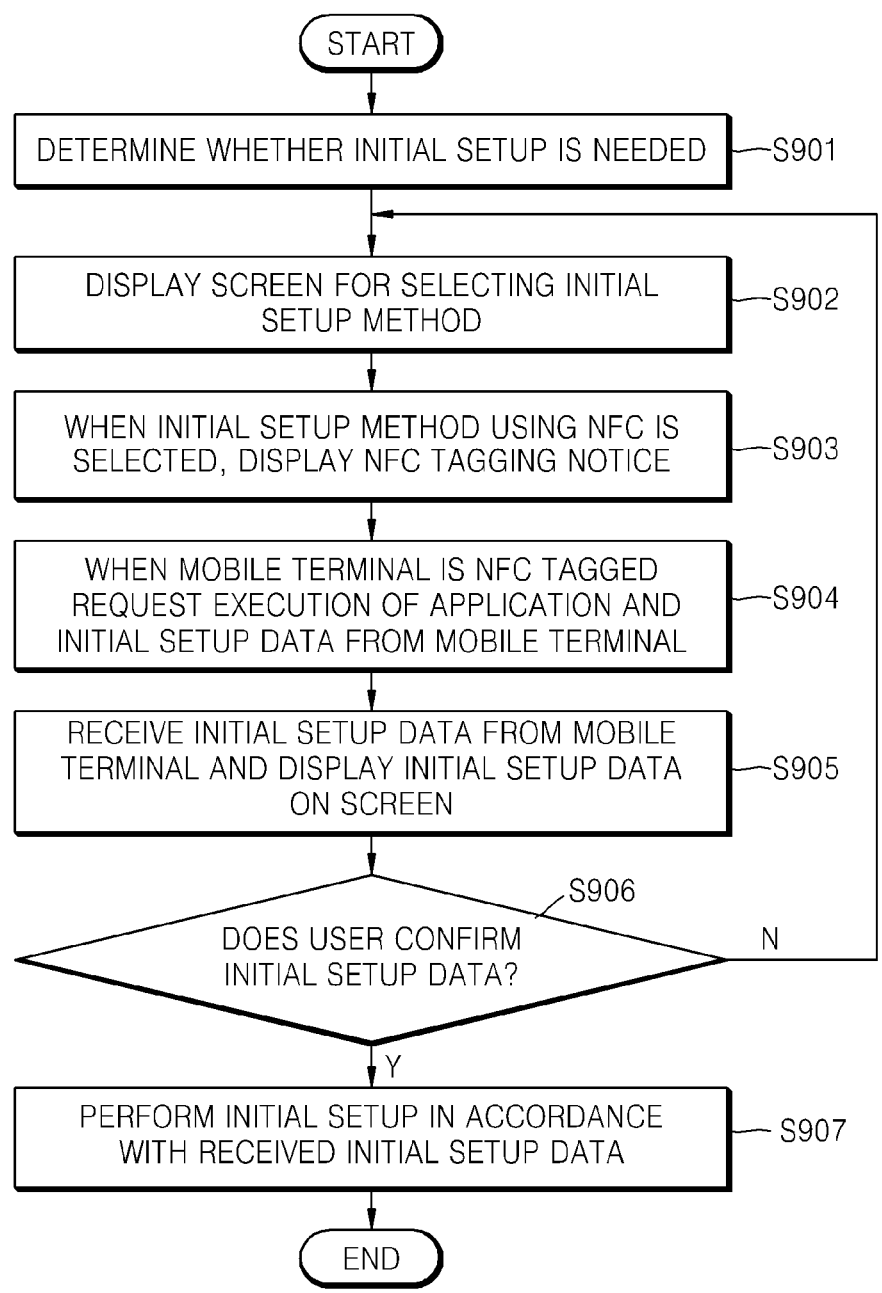
Figure 10:
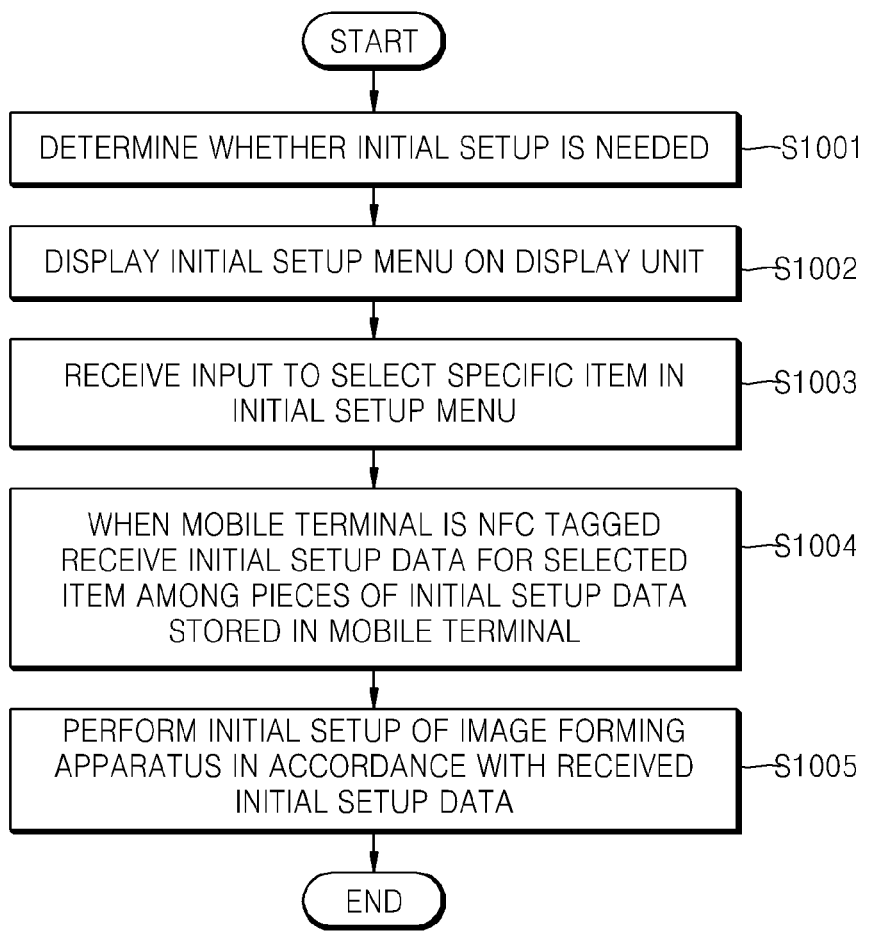

FIGS. 8 to 10 are flowcharts of operations of an initial setup method of an image forming apparatus using NFC, according to embodiments.

Referring to FIG. 8, in operation S801, it is determined whether the initial setup of a language, a country, a time, a date, an administrator account, a time zone, a clock mode, and the like is needed. As a result of the determination, when it is determined that the initial setup is needed, in operation S802, an initial setup menu is displayed on a display unit of the image forming apparatus. At this time, the initial setup menu refers to a menu in which items to be subjected to initial setup may be selected and setting values for the selected items may be input. A user may perform initial setup by a method of directly inputting values for the initial setup through the initial setup menu. However, in the current embodiment, the initial setup is performed by NFC tagging a mobile terminal in a state where the initial setup menu is displayed on the display unit of the image forming apparatus.

In operation S803, when the mobile terminal is NFC tagged, the image forming apparatus receives initial setup data stored in the mobile terminal. At this time, the initial setup data stored in the mobile terminal refers to information on values that are set in the mobile terminal. That is, the information includes a language, a country, a time, a date, an administrator account, a time zone, a clock mode, and the like that are set in the mobile terminal.

In operation S804, the image forming apparatus performs initial setup in accordance with the initial setup data received in operation S803. Accordingly, the setting of the image forming apparatus is performed in the same manner as the language, the country, the time, the date, the administrator account, the time zone, the clock mode, and the like, which are set in the mobile terminal.

In this manner, the initial setup of the image forming apparatus may be simply performed in the same manner as the setting of the mobile terminal through only NFC tagging, thereby reducing inconvenience that a user has to input setting values.

Referring to FIG. 9, in operation S901, it is determined whether the initial setup of the image forming apparatus is needed. When it is determined that the initial setup is needed, in operation S902, a screen for selecting an initial setup method is displayed together with the initial setup menu on the display unit. That is, a screen capable of selecting any one of an initial setup method using NFC and an initial setup method based on manual input is displayed. When the initial setup method using NFC is selected, in operation S903, a notice to tag the NFC device is displayed on the display unit of the image forming apparatus.

In operation S904, when the mobile terminal is NFC tagged with the image forming apparatus, the image forming apparatus request the execution of an application and initial setup data from the mobile terminal. At this time, the application is an application which is executed in the mobile terminal in order to perform the initial setup of the image forming apparatus. The application acquires the initial setup data stored in the mobile terminal and transmits the initial setup data to the image forming apparatus.

Subsequently, in operation S905, the image forming apparatus receives the initial setup data from the mobile terminal and displays the initial setup data on the display unit of the image forming apparatus. In operation S906, it is determined whether a user confirms the initial setup data displayed on the display unit of the image forming apparatus.

When it is determined that the user confirms the displayed initial setup data, the method proceeds to operation S907 to perform initial setup in accordance with the received initial setup data. However, when it is determined that the user does not confirm the displayed initial setup data, the method returns to operation S902. At this time, the initial setup menu may be displayed using the initial setup data received in operation S905 as a reference setting value. This is because there is a high possibility that most the pieces of initial setup data received from the mobile terminal 200 are exact, but only some of them have an erroneous value, and thus when the user does not input confirmation, only the setting for the corresponding item may be corrected.

Referring to FIG. 10, in operation S1001, it is determined whether the initial setup of the image forming apparatus is needed. When it is determined that the initial setup is needed, in operation S1002, an initial setup menu is displayed on the display unit of the image forming apparatus.

In operation S1003, an input to select a specific item in the initial setup menu is received. For example, an input to select any one item from among a language, a country, a time, a date, an administrator account, a time zone, and a clock mode, which are initial setup items, is received.

When the input to select the item is received, a screen capable of setting the selected item is displayed on the display unit of the image forming apparatus. In this state, when the mobile terminal is NFC tagged in operation S1004, the initial setup data for the selected item, among the pieces of initial setup data stored in the mobile terminal, is received.

For example, when the mobile terminal is NFC tagged in a state where a date item is selected in the initial setup menu and then a screen for setting a date is displayed on the display unit of the image forming apparatus, the image forming apparatus requests the initial setup data for the date from the mobile terminal, and the mobile terminal transmits the initial setup data for the date to the image forming apparatus, in response to the request.

In operation S1005, initial setup for the selected item of the image forming apparatus is performed in accordance with the received initial setup data.

Although an embodiment is not additionally described, only initial setup data for an item, which is determined in advance among initial setup items, may be received to perform initial setup. For example, in a case of a machine which is shared by many people like a multi-function printer used in an office, items such as a time or a date do not vary depending on individuals, but items such as a language or an administrator account may vary depending on individuals. Accordingly, when a mobile terminal is NFC tagged, only initial setup data for the language or the administrator account is received and initial setup is performed, and thus user convenience may be improved in an environment where many people share a multi-function printer.

As described above, according to an embodiment, a user may simply perform NFC tagging of a mobile terminal without directly inputting initial setup, and thus the initial setup of a multi-function printer may be performed in accordance with the setting of the mobile terminal, thereby improving user convenience.

As described above, according to an embodiment, initial setup data stored in a user terminal may be simply applied to an image forming apparatus only by NFC tagging the user terminal with the image forming apparatus.

It should be understood that exemplary embodiments described therein should be considered in a descriptive sense only and not for purposes of limitation. Descriptions of features or aspects within embodiments should typically be considered as available for other similar features or aspects in other embodiments.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

While embodiments have been described with reference to the figures, it will be understood by those of ordinary skill in the art that various changes in form and details may be made therein without departing from the spirit and scope of the present disclosure as defined by the following claims.

What is claimed is:

1. An initial setup method of an image forming apparatus using near field communication (NFC), the method comprising:
    determining whether an initial setup of the image forming apparatus is needed;
    displaying an initial setup menu on a display of the image forming apparatus when the initial setup is determined to be needed;
    receiving initial setup data stored in a mobile terminal through NFC by the image forming apparatus when the mobile terminal is NFC tagged with the image forming apparatus; and
    performing the initial setup of the image forming apparatus in accordance with the received initial setup data,
    wherein the initial setup data includes value for at least one item which needs to be set in the image forming apparatus, and
    wherein the receiving of the initial setup data comprises:
        requesting, by the image forming apparatus, execution of an application for performing initial setup to the mobile terminal, when the mobile terminal is NFC tagged;
        requesting, by the image forming apparatus, the initial setup data stored in the mobile terminal to the application executed on the mobile terminal; and
        receiving, by the image forming apparatus, the requested initial setup data from the application executed on the mobile terminal.

2. The method of claim 1, wherein the displaying of the initial setup menu on the display comprises displaying a screen for requesting a selection of any one of an initial setup method using NFC and a manual initial setup method.

3. The method of claim 2, wherein the displaying of the initial setup menu on the display comprises displaying a message for requesting tagging of a terminal supporting NFC when the initial setup method using NFC is selected.

4. The method of claim 1, wherein the performing of the initial setup comprises
    displaying the received initial setup data on the display of the image forming apparatus; and storing the initial setup data in a memory of the image forming apparatus, when confirmation for the initial setup data displayed on the display is received from a user.

5. The method of claim 4, further comprising, when the user does not confirm the initial setup data displayed on the display, displaying the initial setup menu on the display by using the received initial setup data as a reference setting value.

6. The method of claim 1, wherein the receiving of the initial setup data comprises:
  receiving selection of an item from a plurality of items in the initial setup menu; and
  receiving initial setup data for the selected item when the mobile terminal is NFC tagged.

7. The method of claim 6, wherein the plurality of items comprise at least one of a language, a country, a time, a date, an administrator account, a time zone, or a clock mode.

8. The method of claim 1, wherein the receiving of the initial setup data comprises receiving initial setup data for an item which is determined in advance in the initial setup menu.

9. The method of claim 1, wherein the determining of whether the initial setup is needed comprises determining that the initial setup is needed when the initial setup is not performed on the image forming apparatus or when a user requests the initial setup.

10. At least one non-transitory computer-readable medium storing computer-readable instructions when executed control at least one processor to implement the method of claim 1.

11. An image forming apparatus supporting near field communication (NFC), the image forming apparatus comprising:
  an NFC reader configured to perform wireless communication with a mobile terminal supporting NFC;
  a touch screen configured to:
    display a screen to a user, and
    receive an input from the user;
  a memory configured to store initial setup data and instructions;
  a multifunction device comprising at least one of a printer, a scanner or a fax configured to perform an image forming operation; and
  at least one processor executing the stored instructions configured to:
    request execution of an application for performing initial setup to the mobile terminal when the mobile terminal is NFC tagged with the NFC reader in a state where an initial setup menu is displayed on the touch screen,
    request the initial setup data stored in the mobile terminal to the application executed on the mobile terminal,
    receive the requested initial setup data through the NFC reader from the application executed on the mobile terminal, and
    perform an initial setup of the image forming apparatus in accordance with the received initial setup data,
  wherein the initial setup data includes value for at least one item which needs to be set in the image forming apparatus.

12. The image forming apparatus of claim 11, wherein the touch screen is further configured to:
  display a screen for requesting to select any one of an initial setup method using NFC and a manual initial setup method, and
  receive an input of selection from the user.

13. The image forming apparatus of claim 12, wherein the touch screen is further configured to display a message for requesting to tag a terminal supporting NFC when the user selects the initial setup method using NFC.

14. The image forming apparatus of claim 11,
  wherein the touch screen is further configured to display the initial setup data received from the mobile terminal, and
  wherein the at least one processor is further configured to store the initial setup data in the memory when an input of confirmation for the initial setup data is received from the user.

15. The image forming apparatus of claim 14, wherein, when the at least one processor does not receive the input of confirmation for the initial setup data from the user, the initial setup menu is displayed on the touch screen by using the received initial setup data as a reference setting value.

16. The image forming apparatus of claim 11, wherein, when the touch screen displays the initial setup menu on a screen and the mobile terminal is NFC tagged with the NFC reader in a state where the user selects an item from a plurality of items in the initial setup menu, the at least one processor is further configured to request the initial setup data for the selected item from the mobile terminal.

17. The image forming apparatus of claim 16, wherein the plurality of items comprise at least one of a language, a country, a time, a date, an administrator account, a time zone, or a clock mode.

18. The image forming apparatus of claim 11, wherein the at least one processor is further configured to request the initial setup data for the item which is set in advance in the initial setup menu from the mobile terminal.

* * * * *